United States Patent Office 2,822,283
Patented Feb. 4, 1958

2,822,283
FLUSHING PIGMENTS

Bruno Blaser and Heinz Linke, Dusseldorf, Germany, assignors to Dehydag, Deutsche Hydrierwerke G. m. b. H., Dusseldorf, Germany, a corporation of Germany No Drawing. Application October 18, 1955
Serial No. 541,314

Claims priority, application Germany October 21, 1954

9 Claims. (Cl. 106—262)

The present invention relates to improvements in the manufacture of non-aqueous pigment dispersions and particularly to the transfer of aqueous pigment pulps directly into organic vehicles by an operation known to those skilled in the art as "flushing." It has special reference to agents for effecting and/or facilitating the transfer.

It is well known to transfer materials, chiefly pigments, precipitated from aqueous solutions and being in a wet state, without drying, in non-aqueous liquid binding agents or vehicles, such as oils, by assistance of additives which effect the reversal of the phases and in consequence the separation of the water.

Now it has been found that for these purposes those cyclohexylamines show excellent flushing effects which are substituted in the nucleus by alkyl radicals and which may likewise be substituted wholly or partly on the nitrogen atom by substituents, particularly by alkyl radicals, or soaps formed by condensing the cyclohexylamines with soap-forming acids, such as resin or fatty acids. Preferably compounds may be used which contain short alkyl radicals such as the corresponding methyl-, ethyl-, propyl- or butyl-cyclohexylamines. A very suitable flushing agent for this purpose is 4-amino-1-methyl-cyclohexane.

The flushing agents according to the present invention may be used for flushing pigments of various kinds, such as ochre, minium, brown or red iron oxide, ferro cyanide blue, titanium oxide, cadmium brown, barium sulfate, calcium carbonate, zinc sulfide, aluminum hydroxide, silica gel and the like.

Valuable color pastes for printing purposes or for lacquers may be obtained when using vegetable, animal, synthetic or mineral oils as non-aqueous vehicles or binding agents in processing the wet pigments. If the above named vehicles or binding agents contain certain amounts of free fatty or resin acids, the alkylated cyclohexyl-amines are capable of condensing with them, forming the corresponding soaps. Nevertheless the effectiveness of the flushing agents is not diminished by the formation of such soaps. Therefore, the corresponding soaps may be added to the pigment suspension instead of the alkylated cyclohexylamine bases to achieve the desired flushing effect.

The use of the flushing agents according to the present invention is not limited to the processing of the above named pigments or non-aqueous vehicles or binding agents. They may be used in the like manner for processing any other pigment materials obtained in a wet state by precipitation from aqueous solutions, and any other non-aqueous vehicles adapted for those materials.

It is already known that cyclohexylamine and its N-substitution products, or the salts of them formed by condensation with soap-forming carboxylic acids, had been used as flushing agents. These agents, however, possess only a small effectiveness and for performing an equal effect it is necessary to use substantially greater amounts.

Example I 5 kg. water-wet ferrocyanide blue having a content of about 30% by weight ferrocyanide blue were worked in a mixing vessel with 5 kg. of a binding agent consisting of a mixture of dibutyl phthalate and castor oil in the ratio of 1:1. After the mixing was completed, 30 gm. of 4-amino-1-methyl-cyclohexane were added in the amount of 2% by weight calculated on the weight of dry ferrocyanide blue. The mixture was again worked in the mixing vessel. After a short time, somewhat less than half an hour, the water began to separate and the color pigment was absorbed by the binding agent. Thereafter, an equal amount of 4-amino-1-methyl-cyclohexane was added and the mixture was kneaded again. The major part of the water separated out after nearly two hours and was removed. The remaining part was easily removed in vacuo at 40–60° C. or by running the mixture over heated rollers. The finished product may be adjusted to other concentrations by adding further amounts of the binding agent.

Example II 5 kg. water-wet aluminum hydroxide having a water content of 80% by weight were worked as described in Example I with 3.5 kg. linseed oil but using as a flushing agent two 5% portions of 4-amino-1-methyl-cyclohexane, calculated on the content of dry pigment. An excellent flushing effect was obtained.

Example III

Two 30 gm. portions of 4-amino-1-propyl-cyclohexane were substituted for the amine of Example I. An excellent flushing effect was obtained.

Example IV

Two 5% portions of 4-dimethylamino-1-methyl-cyclohexane (calculated on the content of dry pigment) were used instead of the amine of Example II. An excellent flushing effect was obtained.

We claim:

1. The method of flushing pigment particles from aqueous paste form into a liquid vehicle immiscible with water to release water, which comprises agitating a mass of aqueous pigment paste with a receiving liquid vehicle which is immiscible with water in the presence of a small quantity of a substituted cyclohexylamine of the formula

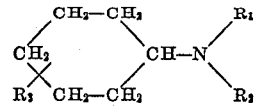

wherein $R_1$ and $R_2$ are selected from the group consisting of hydrogen and lower alkyl, and $R_3$ is lower alkyl.

2. The method of flushing pigment particles from aqueous paste form into a liquid vehicle immiscible with water to release water, which comprises agitating a mass of aqueous pigment paste with a receiving liquid vehicle which is immiscible with water in the presence of a small quantity of 4-amino-1-methyl-cyclohexylamine.

3. The method of flushing pigment particles from aqueous paste form into a liquid vehicle immiscible with water to release water, which comprises agitating a mass of aqueous pigment paste with a receiving liquid vehicle which is immiscible with water in the presence of a small quantity of a substituted cyclohexylamine soap of a cyclohexylamine of the formula

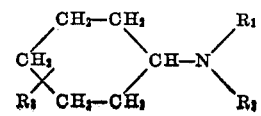

wherein $R_1$ and $R_2$ are selected from the group consisting of hydrogen and lower alkyl, and $R_3$ is lower alkyl, and a soap-forming acid selected from the group consisting of soap-forming resin acids and soap-forming fatty acids.

4. The method of flushing pigment particles from aqueous paste form into a liquid vehicle immiscible with water to release water, which comprises agitating a mass of aqueous pigment paste with a receiving liquid vehicle which is immiscible with water in the presence of a small quantity of 4-amino-1-propyl-cyclohexylamine.

5. The method of flushing pigment particles from aqueous paste form into a liquid vehicle immiscible with water to release water, which comprises agitating a mass of aqueous pigment paste with a receiving liquid vehicle which is immiscible with water in the presence of a small quantity of 4-dimethyl-amino-1-methyl-cyclohexylamine.

6. The method of claim 1, wherein the receiving liquid is castor oil.

7. The method of claim 1, wherein the receiving liquid is linseed oil.

8. The method of claim 1, wherein the pigment is ferrocyanide blue.

9. The method of claim 1, wherein the pigment is aluminum hydroxide.

References Cited in the file of this patent

UNITED STATES PATENTS

| | | |
|---|---|---|
| 2,126,560 | Kyrides | Aug. 9, 1938 |
| 2,192,927 | Morrill | Mar. 12, 1940 |
| 2,271,323 | Yee | Jan. 27, 1942 |

OTHER REFERENCES

Ber. Deut. Chem. Ges., 56, 1020 (1923).